United States Patent Office 2,822,250
Patented Feb. 4, 1958

2,822,250

MATERIAL REMOVAL FROM SEMI-CONDUCTIVE METAL TELLURIDE

Dirk de Nobel, Eindhoven, Netherlands, assignor, by mesne assignments, to North American Philips Company, Inc., New York, N. Y., a corporation of Delaware No Drawing. Application November 28, 1955
Serial No. 549,519

Claims priority, application Netherlands December 1, 1954

3 Claims. (Cl. 41—42)

The invention relates to etching off semi-conductive bodies of a telluride of a bivalent metal in order to obtain a pure surface.

These tellurides of the metals Zn, Cd, Hg, Sn and Pb cannot be dissolved by the conventional chemical agents. In an acidic medium the material is not attacked. With an oxidizing treatment a reaction occurs, the surface then obtaining an adhering layer of tellurium or tellurium oxide in accordance with the strength of the oxidation.

In accordance with the invention a pure surface is obtained by converting superficially a semi-conductive body of a telluride of a bivalent metal with the aid of an oxidizing solution into tellurium or tellurium oxide, and by removing subsequently the surface layer produced with the aid of a solution of $Na_2S_2O_4$ and NaOH.

The concentrations of the two substances may be varied within wide limits, i. e. between a few percent and saturation. Since the $Na_2S_2O_4$ solutions are not constant it is advantageous to use always freshly prepared solutions. Tellurium forms with the solution compounds which are directly soluble in water (i. e. sodium telluride and sodium polytellurides), while tellurium oxide is reduced by the $Na_2S_2O_4$ and then converted into a soluble telluride. The dissolving of the layer obtained by oxidation may be accelerated by heating and is carried out preferably in a boiling solution.

The superficial oxidation of the telluride may be carried out with the aid of solutions of all kinds of oxidizing substances, for example $I_2$, $FeCl_3$, $H_2O_2$, $HNO_3$. The effect thereof may be accelerated by increasing the concentration, the temperature and the pH value. My copending application, Serial No. 549,528 filed November 28, 1955, describes this oxidation technique for CdTe with greater detail.

Several examples of the inventive method will now be described:

*Example 1*

A plate of n-type conductive CdTe is treated, subsequent to scouring and polishing, for one minute with a 22% $HNO_3$ solution, heated to 40° C. The surface turns black owing to the formation of tellurium oxides. Then, for 5 minutes, the material is treated with a boiling solution of 10% of NaOH and 10% of $Na_2S_2O_4$, so that a shining black surface is obtained.

*Example 2*

A plate of p-type conductive PbTe is treated, subsequent to scouring and polishing, with a 22% $NHO_3$ solution, a white layer being thus produced. Then the material is treated with a boiling solution of 5% of NaOH and 5% of $Na_2S_2O_4$. Thus a shining surface is obtained, which is free from tellurium and tellurium oxide.

*Example 3*

A plate of n-type conductive SnTe is treated, subsequent to scouring and polishing, with a 0.1 normal iodine solution, which is acidified to 20% of HCl. Subsequent to boiling in a solution of 5% of NaOH and 1% of $Na_2S_2O_4$ a pure surface is obtained.

What is claimed is:

1. A method of removing by etching a surface portion of a semi-conductive body constituted by a telluride of a bivalent metal, comprising converting the material of said surface portion of said body to a material selected from the group consisting of tellurium, tellurium oxide, and mixtures thereof, and treating said thus-formed surface portion with a solution of $Na_2S_2O_4$ and NaOH to remove same.

2. A method of removing by etching a surface portion of a semi-conductive telluride body selected from the group consisting of ZnTe, CdTe, HgTe, SnTe and PbTe, comprising the steps of first converting the material of said surface portion of said body into a substance selected from the group consisting of tellurium, tellurium oxide and mixtures thereof by treating said surface portion with an oxidizing solution, and thereafter treating said surface portion with a solution of $Na_2S_2O_4$ and NaOH in concentrations ranging between a few per cent and saturation in order to remove the converted material from said surface portion, thereby leaving a clean, pure telluride surface.

3. A method as set forth in claim 2 wherein the last-named solution is boiled during the time of treatment.

References Cited in the file of this patent

FOREIGN PATENTS 123,834    Sweden _____ Jan. 18, 1949

OTHER REFERENCES

Lange: "Handbook of Chemistry," page 266, 1946, sixth ed.

Mellor: "Comprehensive Treatise on Inorganic and Theoretical Chemistry," published by Longmans, Green and Company (New York and London), vol. 11, page 41, published 1924.